United States Patent Office 2,821,667
Patented Jan. 28, 1958

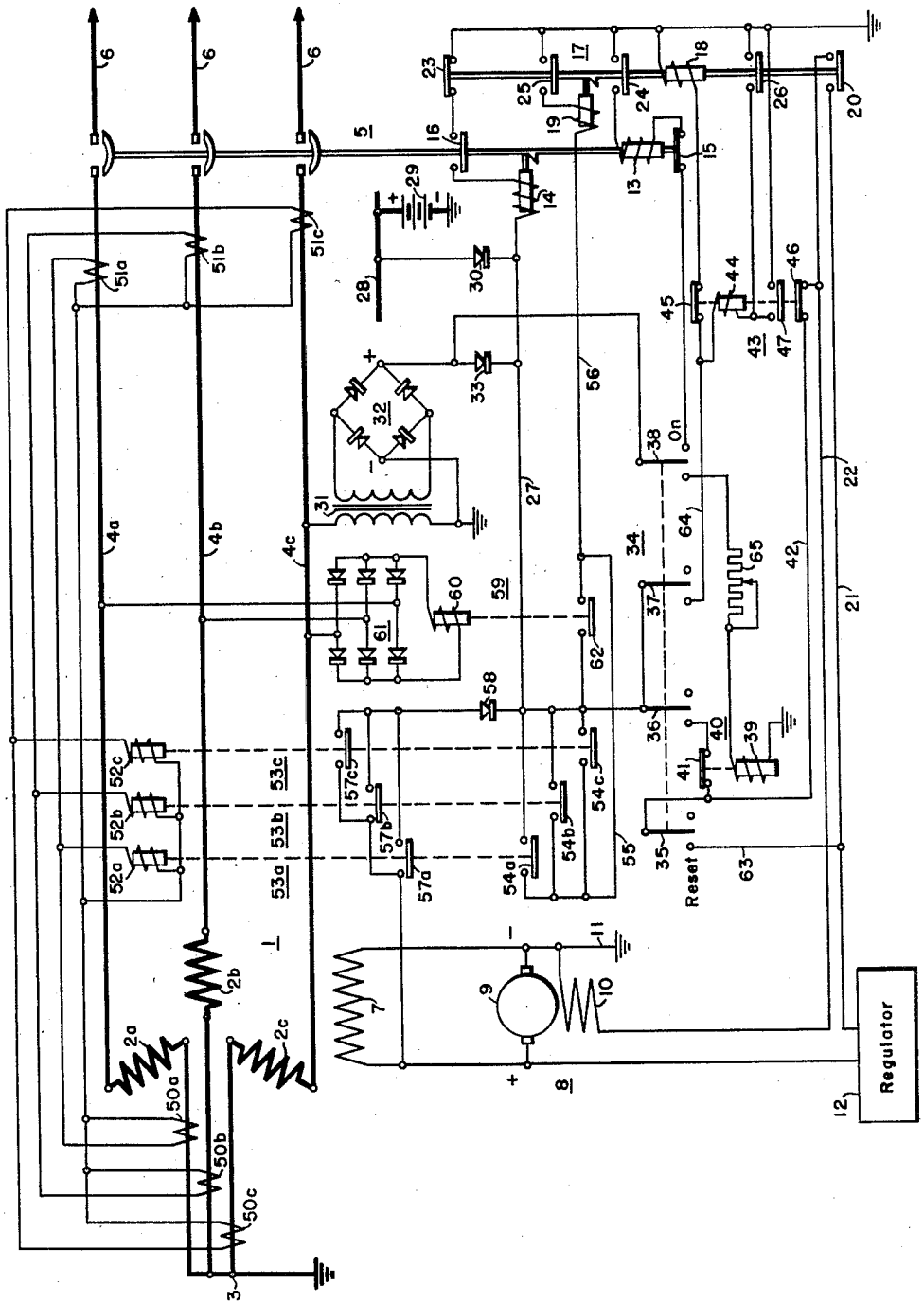

2,821,667

GENERATOR CONTROL AND PROTECTIVE SYSTEM

Bascum O. Austin and Alfred A. Lighty, Lima, Ohio, assignors to Westinghouse Electric Corporation, East Pittsburgh, Pa., a corporation of Pennsylvania Application August 19, 1954, Serial No. 451,019

14 Claims. (Cl. 317—13)

The present invention relates to the control and protection of alternating current generators, and more particularly to a system for controlling the connection of a generator to a load bus and for providing protection against faults.

The control system of the present invention is especially suitable for the control and protection of alternating current electrical power systems used on aircraft, although it will be obvious that its usefulness is not necessarily limited to this particular application. Alternating current aircraft electrical power systems usually consist of one or more alternating current generators driven by main engines of the airplane and connected either individually or in parallel to a load bus which supplies the distribution system to which the various electrical loads on the airplane are connected.

An adequate and uninterrupted supply of electrical energy is necessary to the safe operation of modern aircraft, and it is essential, therefore, that the electrical system must have the highest degree of reliability. This requires the provision of positive and reliable means for removing a generator from the bus and deenergizing its field winding upon the occurrence of a fault in the generator or an overvoltage condition, in order to prevent damage to other generators in the system or to the loads, and to minimize damage to the faulty generator itself. Simplicity and ease of operation are also desirable so that a generator can be put into operation and connected to the bus without difficulty, and with as nearly automatic operation as possible.

The principal object of the present invention is to provide a highly reliable control and protective system for an alternating current generator for controlling the connection of the generator to a load bus and for effecting disconnection of the generator and removing excitation from the generator upon the occurrence of a fault or an overvoltage condition.

Another object of the invention is to provide a control and protective system for an alternating current generator having alternative sources of energization for the various relays of the system, to insure proper operation of the relays under all conditions, so as to obtain a very high degree of reliability.

Still another object of the invention is to provide a control and protective system for an alternating current generator which has fault-responsive relay means for causing the generator to be disconnected from the bus and its field deenergized upon the occurrence of a fault, the relay means also effecting energization of control relays to carry out these operations from the exciter of the generator, in order to insure operation even, if the normal source of energization of the relays should fail.

A further object of the invention is to provide a control and protective system for an alternating current generator having means for applying excitation to the generator field winding from an exciter, to bring the generator up to voltage, and for effecting connection of the generator to a load bus, and also including means for initially supplying direct current to the exciter field winding from an external source to insure that the exciter will build up its voltage and that its polarity will be correct.

A still further object of the invention is to provide a control and protective system for an alternating current generator in which a control relay is utilized to control the connection of the generator to a load bus and to control the generator field excitation, together with fault-responsive means for causing operation of the relay in response to a fault condition, and with lockout means for preventing cycling, or repeated operation, of the control relay if it is attempted to connect the generator to the bus during the existence of a fault and to prevent excitation of the generator field under such conditions.

Other objects and advantages of the invention will be apparent from the following detailed description, taken in connection with the accompanying drawing, the single figure of which is a schematic diagram showing an illustrative embodiment of the invention.

The drawing shows a control and protective system for an alternating current generator 1, which may be of any suitable physical construction, and which is driven by any suitable prime mover (not shown), such as a main engine of an airplane. The generator 1 is shown as a three-phase generator having phase windings 2a, 2b and 2c. One end of each of the phase windings is brought out of the generator and connected to a neutral point 3, which is preferably grounded. The other ends of the phase windings are connected to leads 4a, 4b and 4c, respectively, which are connected by means of a circuit breaker 5 to a three-phase load bus 6. It will be understood that, if desired, one or more other generators, similar to the generator 1 and having similar control systems, may be connected to the bus 6 for operation in parallel with the generator 1.

The generator 1 has a field winding 7 to provide the required generator excitation. The field winding 7 is excited by an exciter 8 which may, if desired, be integral with the generator 1, and which may be of any suitable type. The exciter 8 is shown as a direct-current generator having an armature 9 connected directly to the field winding 7 to supply the excitation for the generator 1. The exciter 8 also has a field winding 10, shown as a self-excited shunt field winding connected across the exciter armature 9. The negative side of the exciter 8 is preferably connected to ground at 11. The exciter 8 may be any type of exciter or excitation means which supplies the necessary exciting current to the generator field 7 and which has a field winding 10 supplied with direct current.

The excitation, and thus the voltage, of the generator 1 is controlled by a voltage regulator 12 connected to control the excitation of the exciter field winding 10. The regulator 12 may be any type of regulator which senses the output voltage of the generator 1 and controls the excitation of the exciter 8 to control its output voltage and thus control the excitation of the main generator 1, so as to maintain constant generator output voltage. The regulator 12 may be of any suitable type and has not been shown in detail, to avoid unnecessary complication of the drawing, since it is not a part of the invention.

The circuit breaker 5, which connects the generator leads to the load bus 6, may be of any suitable type and is shown as having a closing coil 13, which actuates the breaker to closed position when the coil is energized, and a trip coil 14 which releases a latching mechanism and allows the breaker to open when the coil 14 is energized. The circuit breaker 5 preferably has an auxiliary contact 15 connected in series with the closing coil 13, which is closed when the breaker is open, and an auxiliary contact 16 is connected in series with the trip coil 14, which is open when the breaker is open.

Operation of the generator 1 and of the circuit breaker 5 is controlled by a generator control relay 17. The generator control relay 17 is shown as being a latch-type relay having a closing coil 18 which actuates the relay to closed position when energized. The relay has a latching mechanism of any suitable type, which holds it in the closed position, and has a trip coil 19 which releases the latching mechanism when energized, to cause the relay to return to open position. The control relay 17 has a contact 20 which is connected in series in the circuit of the exciter field winding 10 by means of conductors 21 and 22. The relay 17 also has a normally closed contact 23 connected in series with the trip coil 14 of the circuit breaker 5, and a normally open contact 24 in series with the closing coil 13 of the circuit breaker 5. A normally open auxiliary contact 25 is connected in series with the trip coil 19, and the relay 17 has another normally open contact 26, connected as described hereinafter.

The closing and trip coils of the generator control relay 17, as well as the operating coils of certain other relays of the system, are preferably designed to be energized by direct current, and an energizing circuit 27 is provided for the various relays. The circuit 27 is energized from an external source of direct current such as a direct current bus 28, which may be supplied from any suitable direct current source, shown diagrammatically as a battery 29 having its positive terminal connected to the bus and its negative terminal connected to ground. It will be understood that practically all modern aircraft have an auxiliary direct current system in addition to a main alternating current electrical system, so that a direct current bus 28 is normally available. The bus 28, however, is to be taken as representing any suitable source of direct current external to the alternating current system of the generator 1. The direct current bus 28 is connected to the energizing circuit 27 through a blocking rectifier 30, which prevents any possible flow of current from the energizing circuit to the bus 28. In order to obtain a high degree of reliability and prevent any failure of the system to operate in case of loss of the direct current bus 28, means are also provided for supplying the energizing circuit 27 with direct current from the output of the generator 1. For this purpose, the primary winding of a transformer 31 is connected across one phase of the generator 1, and a full-wave rectifier bridge 32 is connected to its secondary winding. The direct current output of the rectifier bridge 32 is connected to the energizing circuit 27 through a blocking rectifier 33.

The system is controlled by a manual switch 34, which is shown as a four-pole switch having contact members 35, 36, 37 and 38. The switch 34 has an off position, shown in the drawing, and has two operating positions, a reset position, to the left in the drawing, and an on position, to the right in the drawing. The switch 34 may be of the momentary contact type for the reset position, so that it must be held in the reset position, and will return to the off position when released. The switch 34 may be of the maintained contact type for the on position.

The contact member 37 of the switch 34 is connected to complete a circuit from the energizing circuit 27 to the closing coil 18 of the control relay 17, when the switch is in the reset position. The contact member 38, in the reset position, connects the coil 39 of a field flashing relay 40 to the rectifier 32 to respond to the output voltage of the generator 1. The field flashing relay 40 has a contact 41, which is connected to the energizing circuit 27 by the contact member 36 of the switch 34, in the reset position, and which connects the energizing circuit to the exciter field winding 10 through a conductor 42 and conductor 22. The contact member 35 of the switch 34 is connected to complete a bypass circuit in parallel with the contact 20 of the control relay 17 to permit excitation of the exciter field 10 under certain conditions, as more fully explained hereinafter.

The system also includes a lockout relay 43. The lockout relay 43 has an operating coil 44 and has a contact 45 connected in series with the closing coil 18 of the relay 17, and a contact 46 in series with the contact member 35 of the manual switch 34, through the conductor 42. The lockout relay 43 also has a sealing contact 47 for maintaining energization of the coil 44 when the relay has operated. The coil 44 of the lockout relay is connected to the contact 26 of the control relay 17 and is energized from the circuit 27 through the contact member 37 of the switch 34.

Protection against faults in the generator 1, or on any of the generator leads 4a, 4b and 4c, is provided by a differential protective relay means. The protective means includes a set of current transformers 50a, 50b and 50c connected to respond, respectively, to the currents in the neutral leads of the generator phase windings, and a set of current transformers 51a, 51b and 51c connected to respond, respectively, to the currents in the generator leads 4a, 4b and 4c. The secondary windings of the corresponding transformers of the two sets of current transformers are connected together in series, as shown, and to the operating coils 52a, 52b and 52c of three differential protective relays 53a, 53b and 53c, so that the relays respond to the difference in the secondary currents of the respective pairs of current transformers. The three differential protective relays have contacts 54a, 54b and 54c, respectively, which are connected in parallel to complete a circuit from the energizing circuit 27 to the trip coil 19 of the control relay 17 through conductors 55 and 56. The differential protective relays also have contacts 57a, 57b and 57c, respectively, which are connected in parallel between the positive side of the exciter 8 and the energizing circuit 27 through a blocking rectifier 58. It will be understood that under normal conditions, there will be no difference in the secondary currents of the respective current transformers, and the relays will not be energized. Upon the occurrence of a fault in the generator 1, or in the leads 4a, 4b, and 4c in the protected zone between the two sets of current transformers, the currents will become unbalanced on opposite sides of the fault, in the phase or phases affected, and the difference in secondary currents between the corresponding current transformers will cause operation of one or more of the relays 53a, 53b and 53c.

Protection against overvoltage of the generator 1 is provided by an overvoltage relay 59. The overvoltage relay 59 may be of any suitable type and may be caused to operate in response to generator voltage in any suitable manner. As shown, the operating coil 60 of the relay 59 is connected to the generator output voltage through a three-phase rectifier bridge 61, so that the relay responds to the average of the three-phase voltages of the generator 1, and operates to close its contact 62 when this average voltage exceeds a predetermined value. The contact 62 is connected to complete a circuit from the energizing circuit 27 to the trip coil 19 of the control relay 17.

The operation of this system may be described as follows. Assume that the generator 1 is disconnected from the bus, the circuit breaker 5 being open, and that all the relays are in their deenergized positions shown in the drawing. If the generator is being driven by its prime mover at normal speed, and it is desired to bring the generator up to its normal voltage and connect it to the bus 6, the manual switch 34 is first moved to the reset position, that is, to the left in the drawing. In this position, the contact member 37 of the switch 34 completes a circuit from the energizing circuit 27 to the closing coil 18 of the control relay 17 through the closed contact 45 of the lockout relay 44. The contact member 36 of the switch 34, at the same time, completes a circuit from the energizing circuit 27 through the closed contact 41 of the relay 40, conductor 42, closed contact 46 of the lockout relay 44 and conductor 22 to the exciter field winding 10, to apply direct current excitation to the field winding from the bus 28, thus flashing the exciter field to insure build-up of the exciter voltage and correct polarity. At the same time, the contact member 35 of the switch 34 completes a circuit from conductor 21 through conductor 63, contact member 35, conductor 42 and lockout relay contact 46 to conductor 22, thus completing the exciter field winding circuit independently of the control relay contact 20. The contact member 38 connects the field flashing relay coil 39 to the rectifier 32 to be energized by the output voltage of the generator 1.

Thus, when the manual switch 34 is placed in the reset position, the closing coil 18 of the generator control relay 17 is energized, which actuates the relay to closed position, and the relay latches in that position. The contact 20 of the control relay 17 is thus closed to complete the exciter field winding circuit to permit the exciter to build up its voltage. At the same time, the exciter field winding is flashed with direct current. If the direct current bus 28 is not energized, however, or for any other reason fails to supply current to the energizing circuit 27, the control relay coil 18 will not be energized and the contact 20 will remain open. The exciter field winding circuit, however, is completed through the lockout relay contact 46 and contact member 35 which, in effect, provide a bypass circuit in parallel with the control relay contact 20. Thus, even though the control relay 17 is not actuated, the exciter field winding circuit is completed when the switch 34 is moved to the reset position, and the exciter can build up from its residual voltage. The exciter, therefore, supplies field excitation to the generator 1, enabling the generator to build up its voltage. As soon as the voltage of the generator 1 has built up sufficiently to energize the circuit 27 through the transformer 31 and rectifier 32, the coil 18 will actuate the control relay 17 to closed position, completing the exciter field winding circuit through the contact 20.

When the control relay 17 is actuated to closed position, it also closes the contacts 24 and 25, setting up circuits for the closing coil 13 of the circuit breaker 5 and for the relay trip coil 19, and it opens the contact 23 in the circuit of the circuit breaker trip coil 14. The contact 26 of the control relay 17 is also closed and completes a circuit for the coil 44 of the lockout relay 43 from the energizing circuit 27 through the contact member 37 and conductor 64. The lockout relay 44 is thus actuated to open its contacts 45 and 46 and to close its contact 47, which completes a sealing circuit for the coil 44 to hold the lockout relay in its actuated position independently of the control relay 17 as long as the switch 34 remains in the reset position.

The field flashing relay 40 opens its contact 41 to disconnect the energizing circuit 27 from the exciter field winding circuit as soon as the generator voltage has reached a predetermined value, since the coil of the relay 40 responds to the generator voltage. An adjustable resistor 65 may be connected in series with the coil 39 to adjust the voltage to which it responds.

When the voltage of the generator 1 has reached its normal value, the generator can be connected to the load bus 6. This is done by moving the switch 34 to the on position, in which the contact member 38 completes a circuit from the rectifier 32 to the closing coil 13 of the circuit breaker 5 to cause the circuit breaker to close. It will be noted that since the breaker closing coil is energized from the rectifier 32, the breaker 5 cannot be closed unless the voltage of the generator 1 is sufficiently high. The system is now in its normal operating condition, with the circuit breaker 5 closed and the control relay 17 latched in its closed position, all other relays of the system being deenergized. It will be understood that, if desired, suitable synchronizing means could be used to control the breaker closing coil 13 in addition to, or instead of, the on position of the switch 34, to properly parallel the generator 1 with other generators connected to the bus 6.

If during normal operation a fault occurs in the generator 1, or on the generator leads within the protected zone between the two sets of current transformers, the secondary currents of the corresponding transformers will become unbalanced, and one or more of the differential protective relays 53a, 53b and 53c will be actuated. When one or more of the contacts 54a, 54b and 54c close, a circuit is completed from the energizing circuit 27 through conductors 55 and 56 to the trip coil 19 of the generator control relay 17. At the same time, corresponding contacts 57a, 57b or 57c of the differential protective relays close and complete a circuit from the exciter 8 to the energizing circuit 27. Thus, the trip coil 19 of the control relay 17 is energized to cause the relay 17 to open since the contact 25 is closed during normal operation. When the relay 17 is tripped, it closes the contact 23 to complete the circuit of the breaker trip coil 14, causing the breaker 5 to open and disconnect the generator 1 from the bus. At the same time, the contact 20 opens and interrupts the exciter field circuit to remove excitation from the generator.

If the bus 28 is not energized, or fails to supply current to the circuit 27 for any other reason, the connection of the exciter output voltage to the circuit 27 by the differential protective relays will supply the necessary energization for the trip coils. This is an important feature contributing to reliable operation of the system under all conditions, since it is possible, either because of the failure of the direct current supply or for other reasons, that the bus 28 might not supply current for tripping when needed, and under fault conditions, the generator output voltage would usually be so low that it could not supply sufficient energization through the rectifier 32. Thus, if the direct current supply failed, it would be impossible to trip the control relay 17 and breaker 5, under fault conditions. The connection of the exciter output voltage to the energizing circuit 27, however, prevents such a possibility, since under fault conditions, the exciter 8 will usually be at ceiling voltage so that there will be adequate excitation for the trip coils. The rectifier 58 prevents excitation of the generator field winding 7 from the bus 28 if a fault occurs when the normal direct current supply is available.

If an overvoltage condition occurs during normal operation, the overvoltage relay 59 closes its contact 62 and energizes the trip coil 19 of the relay 17 from the energizing circuit 27 through conductor 56. The relay 17 is thus tripped and effects tripping of the breaker 5 and interruption of the exciter field circuit as previously described. In case of an overvoltage condition, the generator output voltage will, of course, be high enough to insure positive tripping of the relay 17 and the circuit breaker 5 from the rectifier 32, even if the direct current supply from the bus 28 is not available.

It will be seen, therefore, that in the event of a fault in the generator 1 or on the generator leads, or an overvoltage condition, occurring during operation of the generator, the circuit breaker 5 is rapidly and reliably tripped, and the exciter field winding circuit is interrupted to remove excitation from the generator, thus providing the required protection in a highly reliable manner. After operation of the protective system in this manner, the generator 1 cannot be reconnected to the bus 6 except by manually operating the switch 34 to reset position to reclose the control relay 17, and then to on position to close the breaker 5. If it is attempted to reset the system during the existence of a fault, or if a fault should occur while the switch 34 is being held in the reset position, no damage can occur. Thus, if the switch 34 is moved to the reset position while a fault is still in existence, the generator control relay 17 will be actuated to closed position, as previously described, and the lockout relay 44 will be energized to open its contacts 45 and 46. If there is a fault at this time, one or more of the protective relay contacts 54a, 54b and 54c will be closed, and the relay 17 will be immediately tripped as soon as it has closed. The lockout relay 43, however, seals itself in the actuated position, by means of the contact 47, and the control relay 17 therefore cannot reclose after tripping, since the circuit of its closing coil 18 is interrupted by the lockout relay contact 45 after the relay 17 has once been closed. Thus, the relay 17 cannot cycle, or operate repeatedly, even though the switch 34 is held in the reset position during a fault. Similarly, the lockout relay contact 46 remains open, and the exciter field winding circuit thus remains open, so that excitation cannot be applied to the generator 1.

It should now be apparent that a control and protective system for alternating current generators has been provided which provides relatively simple operation to effect excitation of the generator, to bring it up to voltage, and connection of the generator to a load bus, and which provides highly reliable operation to disconnect the generator from the bus and remove its field excitation in case of a fault or an overvoltage condition.

A specific embodiment of the invention has been shown and described for the purpose of illustration, but it is to be understood that various other embodiments and modifications are possible and are within the scope of the invention.

We claim as our invention:

1. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, the control relay having closing means for actuating the relay to closed position and having tripping means for actuating the relay to open position, means for energizing said closing means from the energizing circuit, the control relay having contact means connected to effect completion of the exciter field winding circuit when the control relay is in closed position, and relay means responsive to a fault in the generator or generator leads for energizing said tripping means from the energizing circuit, said contact means of the control relay effecting interruption of the exciter field winding circuit when the control relay is in open position, and the control relay also having contact means connected to effect opening of said switch means when the control relay is actuated to open position.

2. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, manual switch means having a first position for energizing the control relay from said energizing circuit to actuate the control relay to closed position, the control relay having contact means connected to effect completion of the exciter field winding circuit and partial completion of an energizing circuit for said electrically operated switch means from said rectifier means when the control relay is in closed position, and the manual switch means having a second position for completing said last-mentioned energizing circuit to effect closing of the electrically operated switch means.

3. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, the control relay having closing means for actuating the relay to closed position and having tripping means for actuating the relay to open position, manual switch means having a first position for energizing said closing means from the energizing circuit, the control relay having contact means connected to effect completion of the exciter field winding circuit and partial completion of an energizing circuit for said electrically operated switch means from said rectifier means when the control relay is in closed position, and the manual switch means having a second position for completing said last-mentioned energizing circuit to effect closing of the electrically operated switch means, and relay means responsive to a fault in the generator or generator leads for energizing said tripping means from the first-mentioned energizing circuit, said contact means of the control relay effecting interruption of the exciter field winding circuit when the control relay is in open position, and the control relay also having contact means connected to effect opening of said switch means when the control relay is actuated to open position.

4. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for supplying direct current to the energizing circuit, and relay means responsive to a fault in the generator or generator leads for effecting energization of the control relay from said energizing circuit to actuate the control relay to effect opening of said switch means and interruption of the exciter field winding circuit, said fault responsive relay means including means for connecting the energizing circuit to the exciter to be energized thereby.

5. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, and relay means responsive to a fault in the generator or generator leads for effecting energization of the control relay from said energizing circuit to actuate the control relay to effect opening of said switch means and interruption of the exciter field winding circuit, said fault-responsive relay means including means for connecting the energizing circuit to the exciter to be energized thereby.

6. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, the control relay having closing means for actuating the relay to closed position and having tripping means for actuating the relay to open position, means for energizing said closing means from the energizing circuit, the control relay having contact means connected to effect completion of the exciter field winding circuit when the control relay is in closed position, and relay means responsive to a fault in the generator or generator leads for energizing said tripping means from the energizing circuit, said fault-responsive relay means also including means for connecting the energizing circuit to the exciter to be energized thereby, said contact means of the control relay effecting interruption of the exciter field winding circuit when the control relay is in open position, and the control relay also having contact means connected to effect opening of said switch means when the control relay is actuated to open position.

7. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, the control relay having closing means for actuating the relay to closed position and having tripping means for actuating the relay to open position, manual switch means having a first position for energizing said closing means from the energizing circuit, the control relay having contact means connected to effect completion of the exciter field winding circuit and partial completion of an energizing circuit for said electrically operated switch means from said rectifier means when the control relay is in closed position, and the manual switch means having a second position for completing said last-mentioned energizing circuit to effect closing of the electrically operated switch means, and relay means responsive to a fault in the generator or generator leads for energizing said tripping means from the first-mentioned energizing circuit, said fault-responsive relay means also including means for connecting the first-mentioned energizing circuit to the exciter to be energized thereby, said contact means of the control relay effecting interruption of the exciter field winding circuit when the control relay is in open position, and the control relay also having contact means connected to effect opening of said switch means when the control relay is actuated to open position.

8. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, manual switch means having a first position for energizing the control relay from said energizing circuit to actuate the control relay to closed position to effect completion of the exciter field winding circuit and having a second position for effecting operation of said electrically operated switch means, said manual switch means including means for connecting the exciter field winding to said energizing circuit when the manual switch means is in said first position, and relay means responsive to the voltage of the generator for interrupting said connection of the exciter field winding to the energizing circuit when the generator voltage exceeds a predetermined value.

9. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, manual switch means having a first position for energizing the control relay from said energizing circuit to actuate the control relay to closed position, the control relay having contact means connected to effect completion of the exciter field winding circuit and partial completion of an energizing circuit for said electrically operated switch means from said rectifier means when the control relay is in closed position, the manual switch means also having contact means effective in said first position to connect the exciter field winding to the first-mentioned energizing circuit, and the manual switch means having a second position for completing said last-mentioned energizing circuit to effect closing of the electrically operated switch means.

10. A control and protective system for an alternating current generator having a field winding and an exciter connected to supply direct current to the generator field winding, the exciter having a field winding, said system including a generator control relay having a contact connected in the exciter field winding circuit, an energizing circuit for said control relay, means for connecting the energizing circuit to an external source of direct current, rectifier means connected to supply direct current to the energizing circuit from the output voltage of the generator, switch means for energizing the control relay from the energizing circuit to actuate the control relay to close its contact, and a lockout relay having a contact connected to the exciter field winding circuit, the switch means including a contact cooperating with the contact of the lockout relay to establish a bypass circuit around the control relay contact, the control relay including means for effecting operation of the lockout relay to open its contact when the control relay is actuated to closed position.

11. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, the control relay having a contact connected in the circuit of the exciter field winding and having closing means for actuating the relay to close said contact, the control relay also having tripping means for actuating the relay to open said contact and to effect opening of said electrically operated switch means, manual switch means for energizing said closing means from the energizing circuit, a lockout relay having a contact connected to the exciter field winding circuit, said manual switch means including a contact cooperating with the contact of the lockout relay to establish a bypass circuit around the control relay contact, the control relay including means for effecting energization of the lockout relay to open its contact when the control relay is actuated to closed position, and fault-responsive means for effecting energization of said tripping means of the control relay, said lockout relay having means for maintaining its energization independently of the control relay.

12. A control and protective system for an alternating current generator having a field winding and an exciter connected to supply direct current to the generator field winding, the exciter having a field winding, said system comprising electrically operated switch means for connecting the generator to a load bus, a generator control relay for controlling the circuit of the exciter field winding and the operation of said switching means, an energizing circuit for the control relay, means for connecting the energizing circuit to an external source of direct current, rectifier means connected to supply direct current to the energizing circuit from the output voltage of the generator, the control relay having a contact connected in the circuit of the exciter field winding and having closing means for actuating the relay to close said contact, the control relay also having tripping means for actuating the relay to open said contact and to effect opening of said electrically operated switch means, manual switch means for energizing said closing means from the energizing circuit, a lockout relay having a contact connected in series with the closing means of the control relay and a contact cooperating with the manual switch means to establish a bypass circuit around the control relay contact, the control relay including means for effecting energization of the lockout relay to open its contacts when the control relay is actuated to closed position, and fault-responsive means for effecting energization of said tripping means of the control relay, said lockout relay having means for maintaining its energization independently of the control relay.

13. A control and protective system for an alternating current generator having a field winding and an exciter connected to supply direct current to the generator field winding, the exciter having a field winding, said system including a generator control relay having a contact connected in the exciter field winding circuit, an energizing circuit connected to a source of direct current, switch means for effecting energization of the control relay from said energizing circuit to actuate the control relay to close its contact, and other relay means adapted to be energized from said energizing circuit and having a contact, said switch means including a contact cooperating with the contact of the last-mentioned relay means to establish a bypass circuit around the control relay contact when said other relay means is deenergized.

14. A control and protective system for an alternating current generator having a field winding and an exciter connected to supply direct current to the generator field winding, the exciter having a field winding, said system including a generator control relay having a contact connected in the exciter field winding circuit, an energizing circuit connected to an external source of direct current, rectifier means connected to supply direct current to the energizing circuit from the output voltage of the generator, switch means for effecting energization of the control relay from said energizing circuit to actuate the control relay to close its contact, and other relay means adapted to be energized from said energizing circuit and having a contact, said switch means including a contact cooperating with the contact of the last-mentioned relay means to establish a bypass circuit around the control relay contact when said other relay means is deenergized.

References Cited in the file of this patent

UNITED STATES PATENTS

| | | |
|---|---|---|
| 1,870,817 | Inman | Aug. 9, 1932 |
| 1,906,817 | Seeley | May 2, 1933 |
| 1,994,900 | Shand | Mar. 19, 1935 |
| 2,409,010 | Bany | Oct. 8, 1946 |
| 2,426,005 | Exener | Aug. 19, 1947 |
| 2,426,071 | Veinott | Aug. 19, 1947 |
| 2,484,247 | Ratz | Oct. 11, 1949 |
| 2,492,513 | Allen | Dec. 27, 1949 |
| 2,494,365 | Sills | Jan. 10, 1950 |
| 2,534,895 | Austin et al. | Dec. 19, 1950 |

FOREIGN PATENTS

| | | |
|---|---|---|
| 593,627 | Great Britain | Oct. 22, 1947 |